United States Patent Office 3,088,393
Patented May 7, 1963

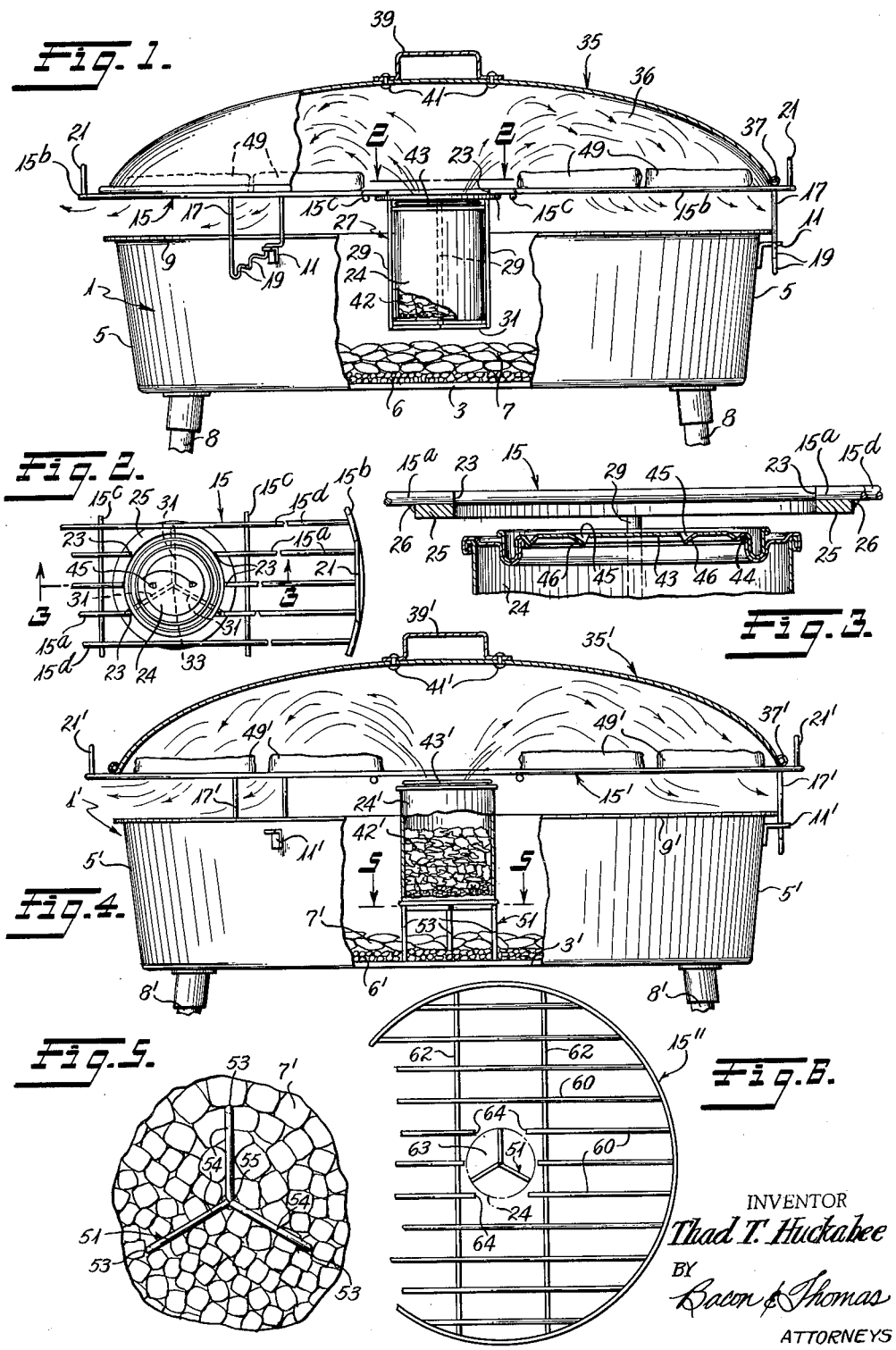

3,088,393
APPARATUS FOR COOKING AND SMOKE-FLAVORING FOOD
Thad T. Huckabee, P.O. Box 749, Albany, Ga.
Filed Nov. 19, 1957, Ser. No. 697,420
9 Claims. (Cl. 99—259)

This invention relates to apparatus for cooking and smoke-flavoring food, and more particularly to a device of this type wherein a heat-responsive, smoke-producing means is positioned in close proximity to both the food being cooked and the burning fuel and wherein further means is provided to accumulate the smoke issuing from said smoke-producing means and cause it to envelop the food and give it a smoked flavor.

It is well-known that many foods, and particularly various meats, are considerably enhanced in flavor when subjected to certain types of smoke, such as hickory wood smoke. Accordingly, the principal object of the present invention is to provide apparatus which is particularly applicable to outdoor barbecuing equipment and which provides means that may be used for producing and directing hickory smoke onto the food while it is being cooked or immediately thereafter, depending upon when the smoke-producing means is placed in position to be heated by the fuel.

The invention contemplates particularly the use, with a grill, of a metallic receptacle having a perforated cover and containing hickory wood chips.

The receptacle is preferably supported above the burning fuel and below the grill. It may be supported by a cage depending from the grill itself, or by a stand independent of the grill. In either event, when heat is applied to the receptacle, the wood chips char and produce smoke, and the smoke is discharged through the perforations in the top of the receptacle. These perforations are limited in size and number so that insufficient air passes therethrough to permit flame burning of the chips.

The invention further contemplates the employment of a fire pot, a food-supporting grill or the like and a dome-shaped cover for the grill, arranged so that smoke from the receptacle is caused to accumulate or collect in a body in a zone including the grill and thus envelop and smoke the food thereon.

Another object of the invention, therfore, is to provide effective means for entrapping a substantial body of smoke in the zone of the grill for subjecting the food thereon to the action of smoke to improve its flavor.

Another important object is to provide means for mounting or supporting a smoke-emitting receptacle in close proximity to a bed of burning fuel, but out of direct contact with the fuel, to thereby increase the useful life of the receptacle.

Another object is to provide a food-smoking receptacle and stand therefor that can be used with existing outdoor cooking equipment or indoor, charcoal and other grills.

Another object is to provide a smoke-producing receptacle having means for directing smoke issuing therefrom in an upward and outward direction.

Another object is to provide a smoke-producing receptacle that can be readily recharged with wood chips whenever necessary.

Another object is to provide a food cooking and smoking device, which is simple in construction, economical to manufacture and readily assemblable, and one wherein the smoke-producing receptacle can readily be installed in position or removed.

Other objects and advantages will be apparent from the following description taken in conjunction with the accompanying drawings, in which:

FIG. 1 is an elevational view, partly in section, of a food grilling and smoking apparatus embodying the principles of the invention;

FIG. 2 is a fragmentary plan view of a portion of the grill of the apparatus shown in FIG. 1, as viewed on the line 2—2 of FIG. 1;

FIG. 3 is an enlarged cross-sectional view through the grill and the upper portion of the smoke-producing receptacle taken on the line 3—3 of FIG. 2;

FIG. 4 is an elevational view, partly in section, showing a modified form of the invention in which a support for the receptacle rests on the bottom of the fire pot;

FIG. 5 is an enlarged view of the receptacle support as viewed on the line 5—5 of FIG. 4; and FIG. 6 is a plan view of a conventional grill modified by cutting away portions of certain of its wires to provide an opening through which the smoke-producing receptacle can be passed and supported upon an underlying stand.

Referring now in greater detail to the drawings, a heating means comprising a circular fire pot 1 is provided in which to burn fuel, and includes a bottom wall 3 and a side wall 5. The bottom wall 3 may be lined with a layer of gravel 6 or the like, which in turn supports a bed of burning fuel, preferably red-hot coals or charcoal embers 7. A plurality of legs 8 are suitably secured to the bottom wall 3 to support the fire pot in spaced relation above the ground. The fire pot 1 is also provided with an outwardly extending flange or rim 9 at the top of the side wall 5, and carries at least three circumferentially spaced bracket members 11 for a purpose which will appear hereinafter.

A grill 15 comprising heavy wire members 15a spaced apart and arranged parallel within a continuous marginal wire 15b and all welded together, is mounted above the fire pot 1 and is preferably of substantially the same configuration but of larger diameter than flange 9 of the fire pot 1. The wires 15a are reinforced by transverse wires 15c welded thereto. The grill 15 includes three legs 17 adjacent its outer margin which extend downwardly past the rim 9 of the fire pot 1. Each leg 17 includes a plurality of steps or shoulders 19, whereby a selected shoulder of the respective steps can rest on one of the bracket members 11 to mount the grill 15 a desired height above the embers 7 in the fire pot 1. The grill 15 also includes a pair of diametrically disposed handle members 21 for lifting it on and off the fire pot 1.

A portion of the wires 15a of the grill 15, preferably at the center thereof, is cut away, as shown in FIG. 2, to provide longitudinally spaced ends 23 outlining an opening sufficiently large for a metallic can or smoke-emitting receptacle 24 to be passed therethrough. The ends 23 are secured together and to continuous wires 15d by a ring member 25 welded thereto at 26 on the underside of the grill 15. The ring member 25 constitutes the upper part of a cage 27 that is disposed below the grill 15. The cage 27 comprises three vertical bars 29 welded at their upper ends to the ring member 25 and having inturned lower horizontal portions 31, which intersect each other and are welded together at a centrally disposed point 33 to form a base for supporting the receptacle 24 in the cage.

A circular cover member 35 is mounted upon the grill 15 and is preferably generally dome-shaped in configuration to provide a smoke chamber 36. Thus, a beaded outer rim 37 of the cover 35 rests directly on the upper surface of grill 15, with the cover 35 enclosing substantially the entire area above the grill. A handle 39 is secured, as by rivets 41, to the top of the cover 35. As seen in FIG. 1, the circular marginal wire 15b of the grill 15 has a greater diameter than the external diameter of the flange 9 to overlie the latter, and the internal diameter of the beaded rim 37 is substantially the same as the outer diameter of the flange 9. The cover 35, therefore, completely overlies the fire pot 1 to provide a smoke receiving and accumulating chamber as described hereinafter.

The smoke-producing receptacle 24 may be a special or conventional can structure, partially filled with chips 42 of hickory or other hardwood. A cover 43 has a friction fit in an opening 44, FIG. 3, at the top of the receptacle 24 and is provided with a limited number of small apertures 45. These apertures have a base wall 46 that is inclined upwardly and outwardly on an angle of about 30° to the horizontal to correspondingly direct smoke from within the receptacle 24. As will be seen from FIG. 1, the receptacle 24 is supported by the cage 27 directly above the bed of fuel 7.

In practice, it has been found advantageous to substantially completely cook the food by conventional barbecuing methods before smoking the food to flavor it. For this purpose, the grill 15, with whatever food 49 is to be cooked is mounted on the receptacle at a suitable level above the glowing embers 7. When the cooking has progressed to the stage desired, the cover 35 is lifted from the grill 15 and the smoke-producing receptacle 24 is positioned in the cage 27. The grill 15 may be adjusted through the legs 17 to position it a suitable distance above the fuel bed 7. The cover 35 is then replaced. Heat from the burning fuel soon causes the wood chips within the receptacle 24 to start to smolder and produce smoke. The smoke issues through the apertures 45 and rises into the smoke chamber 36 in the cover 35, as indicated by the arrows in FIG. 1. Since the apertures 45 are few in number, not enough air is allowed to enter the receptacle 24 to support flame combustion, so that an abundance of smoke is produced, filling the chamber 36 and completely enveloping the food 49. Excess smoke passes downwardly over the food and through the grill 15 and escapes by passing outwardly under the bead 37 of the cover 35. The smoking operation is continued so long as is necessary to give the food the desired flavor.

In the modified form of the invention shown in FIGS. 4 and 5, elements corresponding to those described with reference to FIG. 1 have been given identical numerals but distinguished by an added prime mark. In this form of the invention the grill 15' may be a conventional grill devoid of a central opening. A stand 51 is provided to support a smoke-producing receptacle 24' above the fuel bed 7' on the bottom 3'. The stand 51 includes three vertical legs 53 that may be secured at their lower extremities to the bottom 3', if desired. The upper portions of the legs 53 are turned horizontally inwardly as at 54 and welded together at a common point of intersection 55. The stand 51 may thus be held in assembled relation within the fire pot 5' and the horizontal portions 54 provide a flat surface at the top thereof.

In using the apparatus shown in FIG. 4, the grill 15' and cover 35' are lifted bodily from the fire pot 5' to permit the smoke producing receptacle 24' to be positioned upon the stand 51. In the instance where the stand 51 is not permanently mounted in the fire pot 5', both the stand 51 and the receptacle 24' can be placed in the fire pot when the grill 15' is removed. In either case, the stand 51 is of sufficient height to support the smoke-producing receptacle 24' in position above the embers 7' and directly below the surface of the grill 15'.

A conventional grill can be readily adapted for use with the smoke-producing receptacle 24' and stand 51. Thus, FIG. 6 illustrates a conventional grill 15'' that has been modified by cutting away three of the wires 60 at their central portion between the transverse reinforcing wires 62. The cut away portions leave longitudinally spaced wire ends 64 between which the receptacle 24, shown in dot-and-dash lines, can be passed. A stand 51 is positioned below the grill 15'' to support the receptacle 24 in a manner similar to that illustrated in FIG. 4.

Obviously, the grill 15'' could be originally made with the opening 63 therein by using short pieces of wire in lieu of the long wires 60, and arranging two pieces in longitudinal alignment with their adjacent ends spaced apart similar to the ends 64.

It is to be understood that the grill 15'' can be substituted in FIG. 4 for the grill 15'. When this substitution is made, only the cover 35' need be lifted from the grill in order to place the smoke-producing receptacle 24 in position on the stand 51 by lowering it through the opening 63 in the grill 15''.

It will be apparent that the smoke-producing receptacle 24 and stand 51 can be used with food grilling apparatus other than that illustrated herein, for example, with indoor restaurant grills and permanent, outdoor masonry grills. The size of the receptacle and stand can, of course, be modified to suit requirements and more than one receptacle and stand can be used if the grill is sufficiently large.

It will be obvious that the invention is not limited to a circular fire pot, grill and hood or cover, but that these parts may be made of any shape, such as, round, oval, oblong, or square. It is to be understood, therefore, that the invention is not limited to any particular fire pot contour.

It will be understood that various changes in shape, dimensions, construction, materials and design may be readily made in the structures disclosed herein without departing from the teachings of the invention or the scope of the annexed claims.

I claim:

1. Food cooking and smoke-flavoring apparatus, comprising: means having a surface for supporting a bed of burning fuel; a grill disposed in relatively closely spaced relation directly above said surface to support food to be cooked by said burning fuel by radiant heat and convection; heat responsive smoke-producing means; means supporting said smoke-producing means spaced above said surface in close proximity to said burning fuel, whereby the heat of said burning fuel can activate said smoke-producing means; and cover means removedly supported on said grill and overlying said grill and smoke-producing means, said cover means having a chamber formed therein, and constituting an enclosure for food on said grill and for accumulating smoke from said smoke-producing means in a zone directly above said grill, said grill having an opening, said means for supporting said smoke-producing means being vertically aligned with said opening, said smoke-producing means including a perforated receptacle containing heat-responsive smoke producing material, said opening being larger than said receptacle to permit the receptacle to be passed through said opening onto the means for supporting said smoke-producing means.

2. Apparatus as defined in claim 1, in which the means for supporting the smoke-producing means is a cage depending from the grill.

3. Apparatus as defined in claim 1, in which the grill comprises spaced, parallel wires, certain of which are arranged to provide said opening, and wherein the means for supporting the smoke-producing means is a stand supported on the fuel supporting surface.

4. Food cooking and smoke-flavoring apparatus, comprising: a fire pot having a bottom for supporting a bed of burning fuel; a grill disposed in closely spaced relation directly above said bottom to support food to be cooked by said burning fuel by radiant heat and convection, said grill including a plurality of parallel wires, certain of said wires being formed to provide an opening larger than the space between adjacent wires through said grill; heat-responsive smoke-producing means comprising a receptacle containing heat-responsive smoke-producing material and being small enough to pass through said opening; means suspended from said grill for supporting said smoke-producing means under said opening and spaced above said bottom in close proximity to said burning fuel; and cover means mounted above said grill and smoke-producing means, said cover means having a chamber for accumulating smoke from said smoke-producing means in a zone directly above said grill.

5. Food cooking and smoke-flavoring apparatus, comprising: means having a surface for supporting a bed of burning fuel; a grill disposed in relatively closely spaced relation directly above said surface to support food to be cooked by said burning fuel; heat responsive smoke-producing means; means supporting said smoke-producing means spaced above said surface in close proximity to said burning fuel, whereby the heat of said burning fuel can activate said smoke-producing means; and removable cover means overlying said grill and smoke-producing means, said cover means having a chamber formed therein, said chambered cover means constituting an enclosure for food on said grill and for accumulating smoke from said smoke-producing means in a zone directly above said grill; said grill comprising spaced, parallel wires, certain of which are arranged to provide an opening therein larger than the space between adjacent wires, and wherein the smoke-producing means can be passed through said opening, said means for supporting the smoke-producing means comprising a cage depending from the grill in alignment with said opening.

6. Apparatus as defined in claim 5, in which the cage comprises a plurality of circumferentially spaced vertical members secured at their upper ends to the grill, and having inwardly extending, horizontal portions at their lower ends which intersect and are secured together at their point of intersection to provide a support for the smoke-producing means.

7. Food cooking and smoke-flavoring apparatus, comprising: means having a surface for supporting a bed of burning fuel and an upstanding open-ened wall at the margin of said surface; a grill; means supporting said grill in spaced relation above said surface and spaced above the upper edge of said wall to receive food to be cooked by said burning fuel; heat responsive smoke-producing means activatable by the burning fuel on said supporting surface; means supporting said smoke-producing means in close proximity to said burning fuel, whereby the heat of the burning fuel can activate the smoke producing means; and generally dome-shaped cover means overlying said grill and smoke-producing means, said cover means having a chamber for enclosing the food on said grill, said cover means being supported by its lower edge resting on said grill to form an annular opening between the lower edge of the cover and the upper edge of the upstanding wall, whereby smoke from said smoke-producing means is accumulated in a zone above said grill and passes about the food on the grill and escapes through said annular opening at the lower edge of said cover.

8. Food cooking and smoke-flavoring apparatus as recited in claim 7, in which the means having the fuel supporting surface, and the cover are circular in section, and in which the lower edge of the cover has a diameter which is the same as the diameter of the upper edge of the upstanding wall to completely overlie the means having a supporting surface.

9. Food cooking and smoke-flavoring apparatus as recited in claim 7, in which the means for supporting the grill above the upper end of the upstanding wall is vertically adjustable, whereby the size of the annular opening for escaping smoke can be varied.

References Cited in the file of this patent

UNITED STATES PATENTS

| | | |
|---|---|---|
| 305,343 | Siegenthaler | Sept. 16, 1884 |
| 377,404 | Reed | Feb. 7, 1888 |
| 1,249,073 | Halata | Dec. 4, 1917 |
| 1,962,908 | Pierson | June 12, 1934 |
| 1,964,372 | Tygart | June 26, 1934 |
| 2,348,507 | Wells | May 9, 1944 |
| 2,573,772 | Nysten | Nov. 6, 1951 |
| 2,626,561 | Fortune | Jan. 27, 1953 |
| 2,722,882 | Wilson | Nov. 8, 1955 |
| 2,789,877 | Pfundt | Apr. 23, 1957 |
| 2,842,043 | Reuland | July 8, 1958 |
| 2,925,028 | Haynes et al. | Feb. 16, 1960 |

FOREIGN PATENTS

| | | |
|---|---|---|
| 153,267 | Germany | July 9, 1904 |
| 237,068 | Germany | July 21, 1911 |
| 280,131 | Switzerland | Apr. 16, 1952 |